(12) United States Patent
Kim et al.

(10) Patent No.: US 11,720,193 B2
(45) Date of Patent: *Aug. 8, 2023

(54) DISPLAY MODULE

(71) Applicant: Samsung Display Co., Ltd., Yongin-si (KR)

(72) Inventors: Kwan-Ho Kim, Yongin-si (KR); Gyeongnam Bang, Seoul (KR); Sangwon Lee, Seoul (KR); Hyunjae Na, Seoul (KR); Hoseok Son, Gwangmyeong-si (KR); Sungyeon Cho, Hwaseong-si (KR); Jaseung Ku, Seoul (KR); Taehyeog Jung, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,080

(22) Filed: Feb. 4, 2022

(65) Prior Publication Data

US 2022/0229507 A1 Jul. 21, 2022

Related U.S. Application Data

(63) Continuation of application No. 16/858,716, filed on Apr. 27, 2020, now Pat. No. 11,243,625, which is a
(Continued)

(30) Foreign Application Priority Data

Apr. 24, 2017 (KR) ........................ 10-2017-0052488

(51) Int. Cl.
*G06F 3/044* (2006.01)
*G06F 3/041* (2006.01)
(Continued)

(52) U.S. Cl.
CPC ............ *G06F 3/0412* (2013.01); *G06F 3/047* (2013.01); *G06F 3/0443* (2019.05)

(58) Field of Classification Search
CPC .................................................... G06F 3/0412
See application file for complete search history.

(56) References Cited

U.S. PATENT DOCUMENTS 6,670,949 B1 12/2003 Ahn et al.
8,253,699 B2 8/2012 Son
(Continued)

FOREIGN PATENT DOCUMENTS

| CN | 101334544 | 12/2008 |
|---|---|---|
| CN | 104679369 | 6/2015 |

(Continued)

OTHER PUBLICATIONS

Non-Final Office Action dated Aug. 8, 2019, in U.S. Appl. No. 15/947,864.
(Continued)

*Primary Examiner* — Nan-Ying Yang
(74) *Attorney, Agent, or Firm* — H.C. Park & Associates, PLC

(57) ABSTRACT

A display device including an input sensing unit. The input sensing unit includes sensors and signal lines connecting the sensors to a driving circuit for sensing a touch. The signal lines may include reception signal lines and transmission signal lines. A resistance value of the reception signal line connected to the sensor relatively far from the driving circuit is smaller than a resistance value of the reception signal line connected to the sensor relatively close to the driving circuit.

10 Claims, 13 Drawing Sheets

Related U.S. Application Data continuation of application No. 15/947,864, filed on Apr. 9, 2018, now Pat. No. 10,635,211.

(51) Int. Cl.
  *G09G 3/36* (2006.01)
  *G06F 3/047* (2006.01)

(56) References Cited

U.S. PATENT DOCUMENTS

| | | | |
|---|---|---|---|
| 8,462,129 B2 | 6/2013 | Miyayama et al. | |
| 8,810,534 B2 | 8/2014 | Kim | |
| 9,075,463 B2 | 7/2015 | Pyo et al. | |
| 9,383,849 B2 | 7/2016 | Hur | |
| 9,436,331 B2 | 9/2016 | Jo et al. | |
| 9,772,709 B2 | 9/2017 | Kim et al. | |
| 9,798,434 B2 | 10/2017 | Lee et al. | |
| 9,904,429 B2 | 2/2018 | Lee | |
| 10,332,433 B2 | 6/2019 | Kim et al. | |
| 10,671,122 B2 | 6/2020 | Ko et al. | |
| 2007/0252830 A1 | 11/2007 | Hayata et al. | |
| 2009/0058774 A1* | 3/2009 | Tang | G02F 1/1345 345/87 |
| 2010/0013805 A1* | 1/2010 | Park | H01L 27/3283 345/80 |
| 2010/0302204 A1 | 12/2010 | Miyayama et al. | |
| 2012/0127095 A1 | 5/2012 | Jun | |
| 2013/0201119 A1 | 8/2013 | Yeh et al. | |
| 2013/0277186 A1 | 10/2013 | Sekizawa et al. | |
| 2014/0069796 A1* | 3/2014 | Kang | G06F 1/16 200/600 |
| 2015/0130760 A1* | 5/2015 | Kim | G06F 3/0445 345/174 |
| 2015/0153779 A1 | 6/2015 | Ko et al. | |
| 2016/0299611 A1 | 10/2016 | Park | |
| 2017/0024060 A1 | 1/2017 | Seong et al. | |
| 2017/0097703 A1 | 4/2017 | Lee | |

FOREIGN PATENT DOCUMENTS

| | | |
|---|---|---|
| CN | 106206654 | 12/2016 |
| CN | 106560779 | 4/2017 |
| KR | 10-2001-0010269 | 2/2001 |
| KR | 10-2010-0010019 | 1/2010 |
| KR | 10-2013-0142598 | 12/2013 |
| KR | 10-2014-0096507 | 8/2014 |
| KR | 10-2015-0011583 | 2/2015 |
| KR | 10-2015-0064281 | 6/2015 |
| KR | 10-2015-0125476 | 11/2015 |
| KR | 10-2016-0043583 | 4/2016 |
| KR | 10-2016-0090473 | 8/2016 |
| KR | 10-1686108 | 12/2016 |
| KR | 10-1689331 | 12/2016 |
| KR | 10-1693279 | 1/2017 |

OTHER PUBLICATIONS

Notice of Allowance dated Dec. 27, 2019, in U.S. Appl. No. 15/947,864.
Non-Final Office Action dated Feb. 4, 2021, in U.S. Appl. No. 16/858,716.
Final Office Action dated Jun. 10, 2021, in U.S. Appl. No. 16/858,716.
Advisory Action dated Aug. 24, 2021, in U.S. Appl. No. 16/858,716.
Notice of Allowance dated Sep. 22, 2021, in U.S. Appl. No. 16/858,716.

* cited by examiner

DISPLAY MODULE

CROSS-REFERENCE TO RELATED APPLICATION

This application is a Continuation of U.S. patent application Ser. No. 16/858,716, filed Apr. 27, 2020, which is a Continuation of U.S. patent application Ser. No. 15/947,864, filed Apr. 9, 2018, now issued as U.S. Pat. No. 10,635,211, which claims priority from and the benefit of Korean Patent Application No. 10-2017-0052488, filed on Apr. 24, 2017, each of which is incorporated by reference for all purposes as if fully set forth herein.

BACKGROUND

Field

Exemplary embodiments of the invention relate to a display module including an input sensing unit. More particularly, exemplary embodiments relate to a display module integrated with an input sensing unit.

Discussion of the Background

Electronic devices such as smart phones, digital cameras, notebook computers, navigation systems, and smart televisions have been developed. These electronic devices include display devices to provide information.

The display devices include input sensing units that are used as input devices and are disposed on display panels. The input sensing units may be categorized as any one of add-on type input sensing units, cover glass-integrated type input sensing units, and display-integrated type input sensing units. The display-integrated type input sensing units may include in-cell type input sensing units and on-cell type input sensing units.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments provide a display module capable of reducing a wiring area (or a dead space) formed near an edge of an input sensing unit.

Exemplary embodiments also provide a display module capable of uniform touch sensitivity of an input sensing unit as a whole.

Additional aspects will be set forth in the detailed description which follows, and, in part, will be apparent from the disclosure, or may be learned by practice of the inventive concepts.

According to an exemplary embodiment of the invention, a display module may include a display panel having a pad area to which a printed circuit board is connected, and an input sensing unit in which a sensor area and a wiring area adjacent to the sensor area are defined.

The sensor area may include a plurality of reception sensors extending in a first direction and arranged in a second direction intersecting the first direction, and a plurality of transmission sensors intersecting the plurality of reception sensors.

The wiring area may include a plurality of reception signal lines connected to the plurality of reception sensors, respectively, and a plurality of transmission signal lines connected to the plurality of transmission sensors, respectively.

A resistance value of the reception signal line connected to the reception sensor spaced apart from the printed circuit board by a first distance may be smaller than a resistance value of the reception signal line connected to the reception sensor spaced apart from the printed circuit board by a second distance that is smaller than the first distance.

A resistance value of one, having the minimum resistance, of the plurality of transmission signal lines may range from 80% to 99% of a resistance value of another, having the maximum resistance, of the plurality of transmission signal lines.

The plurality of transmission signal lines may include first transmission signal lines and second transmission signal lines. The first transmission signal lines and the second transmission signal lines may be symmetrical with respect to an imaginary straight line parallel to the second direction.

A driving circuit for driving the display panel may be mounted on the printed circuit board.

The first transmission signal lines and the second transmission signal lines may be symmetrical with respect to the driving circuit.

In some exemplary embodiments, at least one of the plurality of reception signal lines may include a resistance value-increasing portion, and the resistance value-increasing portion may have a meandering shape, such as a square wave. The resistance value-increasing portion may be disposed between the sensor area and the pad area.

In some exemplary embodiments, the plurality of reception sensors may include first reception sensors and second reception sensors. An extending direction of corresponding reception signal lines extending from the first reception sensors may be different from an extending direction of corresponding reception signal lines extending from the second reception sensors.

Distances of the first reception sensors from the printed circuit board may be greater than distances of the second reception sensors from the printed circuit board.

In some exemplary embodiments, the first reception sensors and the second reception sensors may be alternately arranged.

In some exemplary embodiments, the display panel may include an element layer including an organic light-emitting element, and a thin film encapsulation layer encapsulating the element layer.

In some exemplary embodiments, the plurality of reception sensors and the plurality of transmission sensors may be disposed directly on the thin film encapsulation layer.

In some exemplary embodiments, at least one of the plurality of reception signal lines may have a thickness gradually increasing while extending in the second direction.

In some exemplary embodiments, the reception signal lines may have thicknesses different from each other.

According to an exemplary embodiment of the invention, a display module may include a display panel having a pad area to which a printed circuit board is connected, and an input sensing unit in which a sensor area and a wiring area adjacent to the sensor area are defined.

The sensor area may include first to $n^{th}$ reception sensors extending in a first direction and sequentially arranged toward the pad area in a second direction intersecting the first direction, and a plurality of transmission sensors capacitively coupled to the first to $n^{th}$ reception sensors, where n is an integer greater than 1.

The wiring area may include first to $n^{th}$ reception signal lines connected to ends of the first to $n^{th}$ reception sensors, respectively, and a plurality of transmission signal lines connected to ends of the plurality of transmission sensors, respectively.

A resistance value of a $k^{th}$ reception signal line of the first to $n^{th}$ reception signal lines may be smaller than a resistance value of a $k+1^{th}$ reception signal line of the first to $n^{th}$ reception signal lines, where k is an integer greater than 0.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
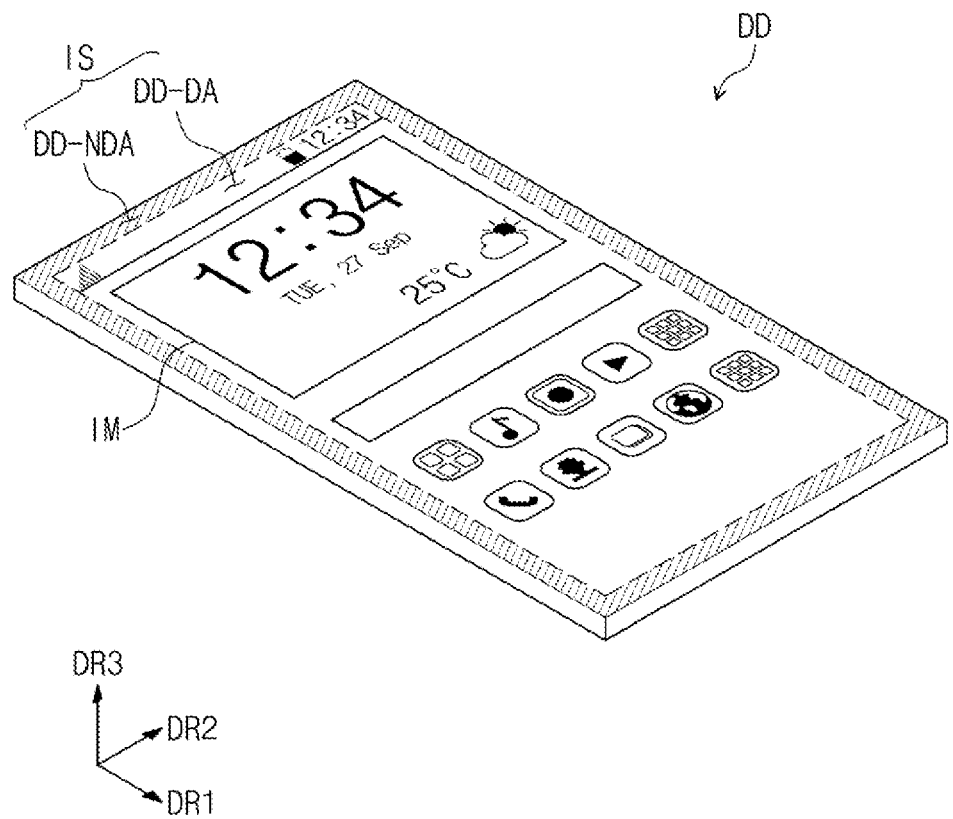
FIG. 1 is a perspective view illustrating a display device according to an exemplary embodiment of the invention.

In the following description, for the purposes of explanation, numerous specific details are set forth in order to provide a thorough understanding of various exemplary. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items. Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular exemplary embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a perspective view illustrating a display device DD according to an exemplary embodiment of the invention.

A display surface IS on which an image IM is displayed is parallel to a plane defined by a first directional axis DR1 and a second directional axis DR2. A normal direction of the display surface IS (i.e., a thickness direction of the display device DD) is parallel to a third directional axis DR3. A front surface (or a top surface) and a back surface (or a bottom surface) of each of the members of the display are defined by the third directional axis DR3. However, directions indicated by the first to third directional axes DR1, DR2, and DR3 may be relative concepts and may be changed into other directions. Hereinafter, first to third directions are the directions indicated by the first to third directional axes DR1, DR2, and DR3, respectively, and are indicated by the same reference designators as the first to third directional axes DR1, DR2, and DR3.

The display device DD according to the exemplary embodiments may be used in large-sized electronic devices (e.g., televisions and monitors) and small and middle-sized electronic devices (e.g., portable phones, tablets, car navigation units, game consoles, and smart watches).

Referring to FIG. 1, the display surface IS of the display device DD may include a plurality of areas. The display surface IS includes a display area DD-DA in which the image IM is displayed, and a non-display area DD-NDA adjacent to the display area DD-DA. No image is displayed in the non-display area DD-NDA. A bezel area of the display device DD may be defined by the non-display area DD-NDA. In FIG. 1, application icons are illustrated as an example of the image IM. For example, the display area DD-DA may have a quadrilateral shape. The non-display area DD-NDA may surround the display area DD-DA. However, exemplary embodiments of the invention are not limited thereto. The shapes of the display area DD-DA and the non-display area DD-NDA may be relatively designed.

Figure 2:
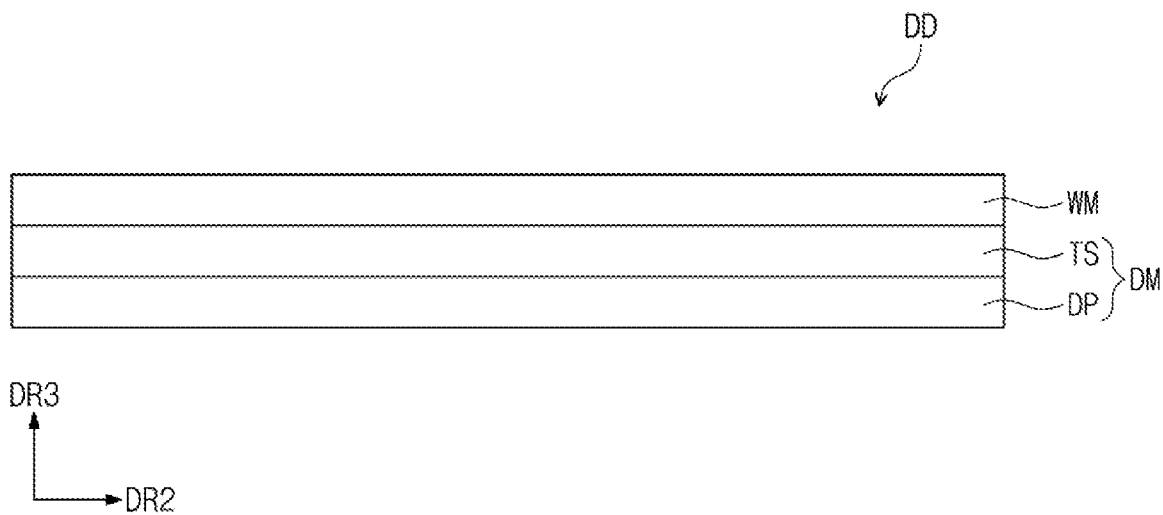
FIG. 2 is a cross-sectional view illustrating a portion of the display device illustrated in FIG. 1.

FIG. 2 is a cross-sectional view illustrating a portion of the display device DD illustrated in FIG. 1. The display device DD may include a window member WM and a display module DM. The display module DM may include an input sensing unit TS and a display panel DP.

The window member WM may protect the display module DM from an external impact and may provide an input surface to a user. The window member WM may include glass or plastic. The window member WM has a transparent property to transmit light generated from the display panel DP.

Even though not shown in the drawings, an adhesive member may be disposed between the window member WM and the display module DM.

Even though not shown in the drawings, the display device DD may include a protective film disposed under the display module DM. The protective film may include a plastic film as a base layer. A material of the protective film is not limited to plastic resins. In another exemplary embodiment, the protective film may include an organic/inorganic composite material.

Figure 3:
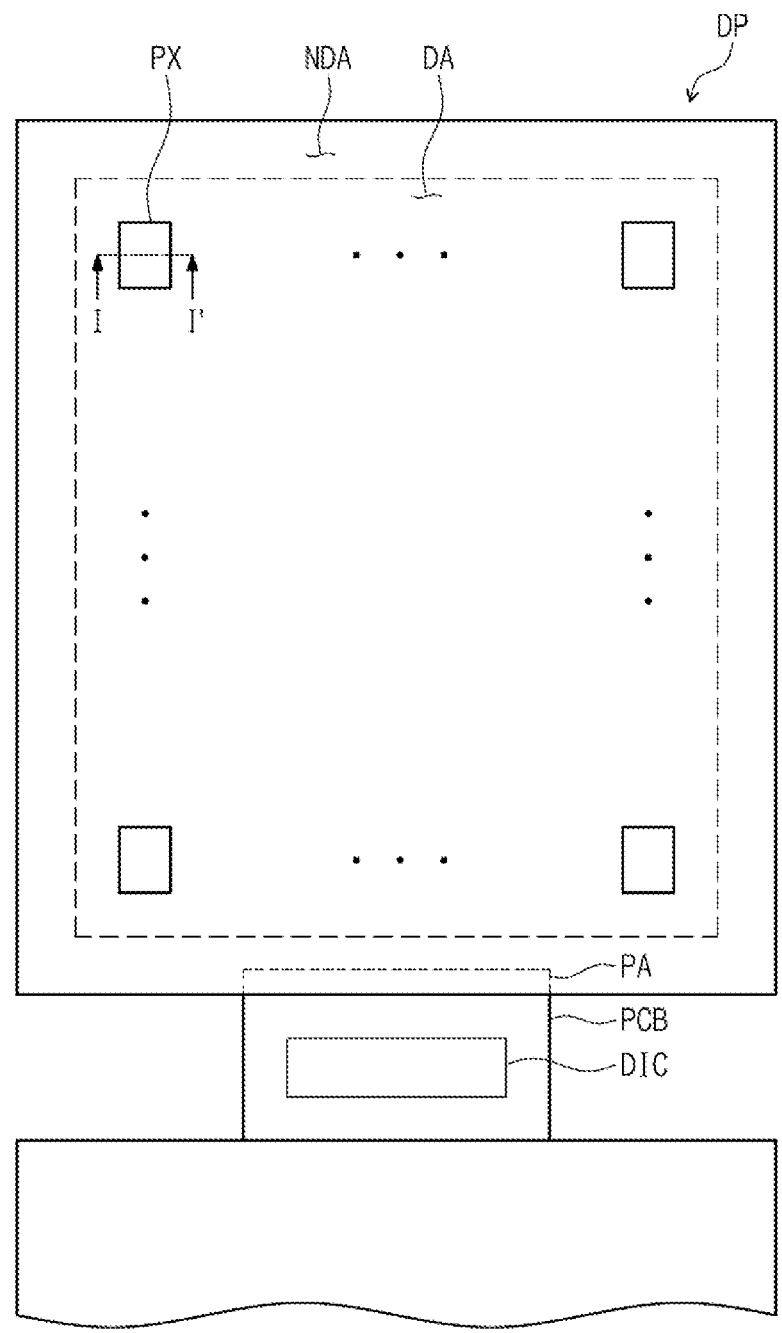
FIG. 3 is a plan view illustrating a display panel illustrated in FIG. 2.

FIG. 3 is a plan view illustrating the display panel DP illustrated in FIG. 2.

The display panel DP may include a display area DA and a non-display area NDA. The display area DA may be defined as an area in which pixels PX are disposed to provide image information to users. The non-display area NDA may be defined as an area which is disposed around the display area DA and in which interconnection lines and electronic parts for driving the pixels PX are disposed.

The non-display area NDA includes a pad area PA. A printed circuit board PCB may be connected to the pad area PA.

A driving circuit DIC may be mounted on the printed circuit board PCB. The driving circuit DIC may be mounted on the printed circuit board PCB by a chip-on-glass (COG) method or a chip-on-plastic (COP) method.

The driving circuit DIC may be a source driver integrated circuit for applying a data voltage to the display area DA of the display panel DP, a scan driver integrated circuit for applying a gate voltage to the display area DA of the display panel DP, or a united driver integrated circuit in which the source driver and the scan driver are integrated. FIG. 1 illustrates an example in which a single driving circuit DIC is mounted on the display panel DP. However, exemplary embodiments of the invention are not limited thereto. In other exemplary embodiments, a plurality of integrated circuits (i.e., driving circuits) may be mounted on the display panel DP.

A plurality of the pixels PX may be arranged in a matrix form along the first direction DR1 and the second direction DR2 perpendicular to each other. In an exemplary embodiment of the invention, each of the pixels PX may display at least one of a red color, a green color, or a blue color. In an exemplary embodiment of the invention, each of the pixels PX may display at least one of a white color, a cyan color, or a magenta color. The pixels PX may be defined as a display part of the display panel DP. Each of the pixels PX may include a light-emitting element, and one of the colors described above may be displayed by the light-emitting element.

The display panel DP may be a liquid crystal display panel, an organic light-emitting display panel, or an electrowetting display panel in accordance with a kind of the pixels PX. Hereinafter, the display panel DP according to the present exemplary embodiment will be described as the organic light-emitting display panel. However, exemplary embodiments of the invention are not limited thereto.

Figure 4:
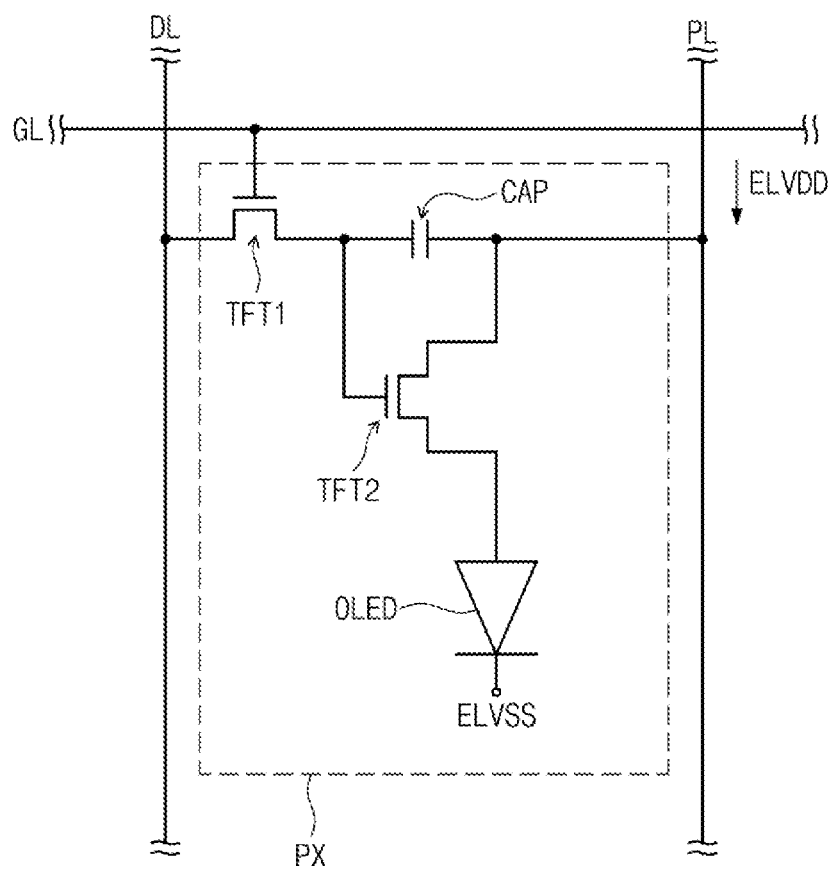
FIG. 4 is an equivalent circuit diagram of a pixel illustrated in FIG. 3.

FIG. 4 is an equivalent circuit diagram of the pixel PX illustrated in FIG. 3. The pixel PX connected to one gate line GL, one data line DL and a power line PL is illustrated as an example in FIG. 4. However, the configuration of the pixel PX is not limited thereto but may be modified.

The pixel PX includes a light-emitting element OLED used as a display element. The light-emitting element OLED may be a front surface light-emitting type diode or a back surface light-emitting type diode. Alternatively, the light-emitting element OLED may be a both surface light-emitting type diode. The pixel PX includes a first transistor (or a switching transistor) TFT1, a second transistor (or a driving transistor) TFT2 and a capacitor CAP which constitute a circuit part for driving the light-emitting element OLED. The light-emitting element OLED generates light by an electrical signal provided from the transistors TFT1 and TFT2.

The first transistor TFT1 outputs a data signal, applied to the data line DL, in response to a scan signal applied to the gate line GL. The capacitor CAP is charged with a voltage corresponding to the data signal received from the first transistor TFT1.

The second transistor TFT2 is connected to the light-emitting element OLED. The second transistor TFT2 controls a driving current, flowing through the light-emitting element OLED, in response to the amount of charges stored in the capacitor CAP. The light-emitting element OLED emits light while the second transistor TFT2 is turned-on.

Figure 5:
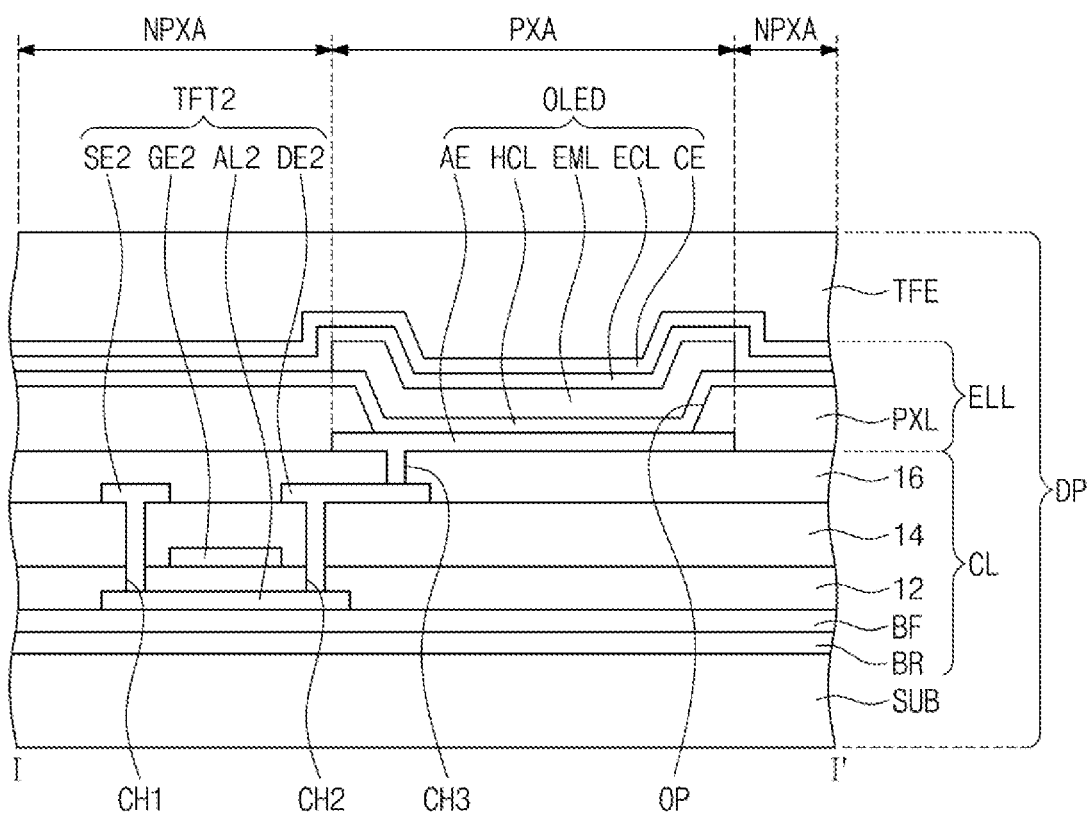
FIG. 5 is a cross-sectional view taken along a line I-I' of FIG. 3.

FIG. 5 is a cross-sectional view taken along a line I-I' of FIG. 3. FIG. 5 is a cross-sectional view of a portion corresponding to the second transistor TFT2 and the light-emitting element OLED of the equivalent circuit illustrated in FIG. 4.

As illustrated in FIG. 5, a circuit layer CL is disposed on a base layer SUB. A semiconductor pattern AL2 of the second transistor TFT2 is disposed on the base layer SUB. The semiconductor pattern AL2 may include amorphous silicon, poly-silicon, or a metal oxide semiconductor.

The circuit layer CL may include organic/inorganic layers BR, BF, 12, 14 and 16, the first transistor TFT1 (see FIG. 4), and the second transistor TFT2. The organic/inorganic layers BR, BF, 12, 14 and 16 may include a functional layer BR and BF, a first insulating layer 12, a second insulating layer 14, and a third insulating layer 16.

The functional layer BR and BF may be disposed on one surface of the base layer SUB. The functional layer BR and BF includes at least one of a barrier layer BR or a buffer layer BF. The semiconductor pattern AL2 may be disposed on the barrier layer BR or the buffer layer BF.

The first insulating layer 12 is disposed on the base layer SUB to cover the semiconductor pattern AL2. The first insulating layer 12 includes an organic layer and/or an inorganic layer. In particular, the first insulating layer 12 may include a plurality of inorganic thin layers. The plurality of inorganic thin layers may include a silicon nitride layer and a silicon oxide layer.

A control electrode GE2 of the second transistor TFT2 is disposed on the first insulating layer 12. Even though not shown in the drawings, a control electrode of the first transistor TFT1 (see FIG. 4) may also be disposed on the first insulating layer 12. The control electrode GE2 and the gate line GL (see FIG. 4) may be formed using the same photolithography process. In other words, the control electrode GE2 and the gate line GL may be formed of the same material, may have the same stack structure, and may be disposed on the same layer.

The second insulating layer 14 is disposed on the first insulating layer 12 to cover the control electrode GE2. The second insulating layer 14 includes an organic layer and/or an inorganic layer. In particular, the second insulating layer 14 may include a plurality of inorganic thin layers. The plurality of inorganic thin layers may include a silicon nitride layer and a silicon oxide layer.

The data line DL (see FIG. 4) may be disposed on the second insulating layer 14. An input electrode SE2 and an output electrode DE2 of the second transistor TFT2 are disposed on the second insulating layer 14. Even though not shown in the drawings, an input electrode and an output electrode of the first transistor TFT1 (see FIG. 4) are also disposed on the second insulating layer 14. The input electrode of the first transistor TFT1 (see FIG. 4) is branched from a corresponding one of the data lines DL. The power line PL (see FIG. 4) and the data lines DL may be disposed on the same layer. The input electrode SE2 of the second transistor TFT2 may be branched from the power line PL.

A portion of electrodes of the capacitor CAP (see FIG. 4) is disposed on the second insulating layer 14. The portion of the electrodes of the capacitor CAP, the data lines DL and the power line PL may be formed using the same photolithography process, may have the same material and the same stack structure, and may be disposed on the same layer.

The input electrode SE2 and the output electrode DE2 are connected to portions of the semiconductor pattern AL2 through a first through-hole CH1 and a second through-hole CH2 penetrating the first and second insulating layers 12 and 14, respectively. Meanwhile, in other exemplary embodiments, the first transistor TFT1 and the second transistor TFT2 may have bottom gate structures.

The third insulating layer 16 is disposed on the second insulating layer 14 to cover the input electrode SE2 and the output electrode DE2. The third insulating layer 16 includes an organic layer and/or an inorganic layer. In particular, the third insulating layer 16 may include an organic material to provide a flat surface.

One of the first, second, and third insulating layers 12, 14, and 16 may be omitted according to a circuit structure of the pixel PX. Each of the second and third insulating layers 14 and 16 may be defined as an interlayer insulating layer. The interlayer insulating layer is disposed between a conductive pattern disposed thereunder and a conductive pattern disposed thereon to insulate the conductive patterns from each other.

A light-emitting element layer ELL is disposed on the third insulating layer 16. The light-emitting element layer ELL includes a pixel-defining layer PXL and the light-emitting element OLED. An anode AE is disposed on the third insulating layer 16. The anode AE is connected to the output electrode DE2 of the second transistor TFT2 through a third through-hole CH3 penetrating the third insulating layer 16. An opening OP is defined in the pixel-defining layer PXL. The opening OP of the pixel-defining layer PXL exposes a portion of the anode AE.

The light-emitting element layer ELL includes a light emitting area PXA and a non-light emitting area NPXA adjacent to the light emitting area PXA. The non-light emitting area NPXA may surround the light emitting area PXA. In the present exemplary embodiment, the light emitting area PXA is defined to correspond to the anode AE. However, the light emitting area PXA is not limited thereto. In other words, it is sufficient that the light emitting area PXA is defined as an area from which light is generated. In certain exemplary embodiments, the light emitting area PXA may be defined to correspond to the portion of the anode AE, which is exposed by the opening OP.

A hole control layer HCL may be disposed in common in both the light emitting area PXA and the non-light emitting area NPXA. Even though not shown in the drawings, a common layer such as the hole control layer HCL may be formed in common in the plurality of pixels PX (see FIG. 4).

A light-emitting layer EML is disposed on the hole control layer HCL. The light-emitting layer EML may be disposed in only an area corresponding to the opening OP. In other words, the light-emitting layers EML respectively formed in the pixels PX may be separated from each other.

The light-emitting layer EML may include an organic material or an inorganic material.

An electron control layer ECL is disposed on the light-emitting layer EML. A cathode CE is disposed on the electron control layer ECL. The cathode CE is disposed throughout all of the plurality of pixels PX.

In the present exemplary embodiment, a patterned light-emitting layer EML is illustrated as an example. However, in another exemplary embodiment, the light-emitting layer EML may be disposed throughout all of the plurality of pixels PX. In this case, the light-emitting layer EML may generate white light. In some exemplary embodiments, the light-emitting layer EML may have a multi-layered structure.

In the present exemplary embodiment, a thin film encapsulation layer TFE directly covers the cathode CE. In some exemplary embodiments, a capping layer covering the cathode CE may further be disposed. In this case, the thin film encapsulation layer TFE may directly cover the capping layer. The thin film encapsulation layer TFE may include an organic layer including an organic material and an inorganic layer including an inorganic material.

Figure 6A:
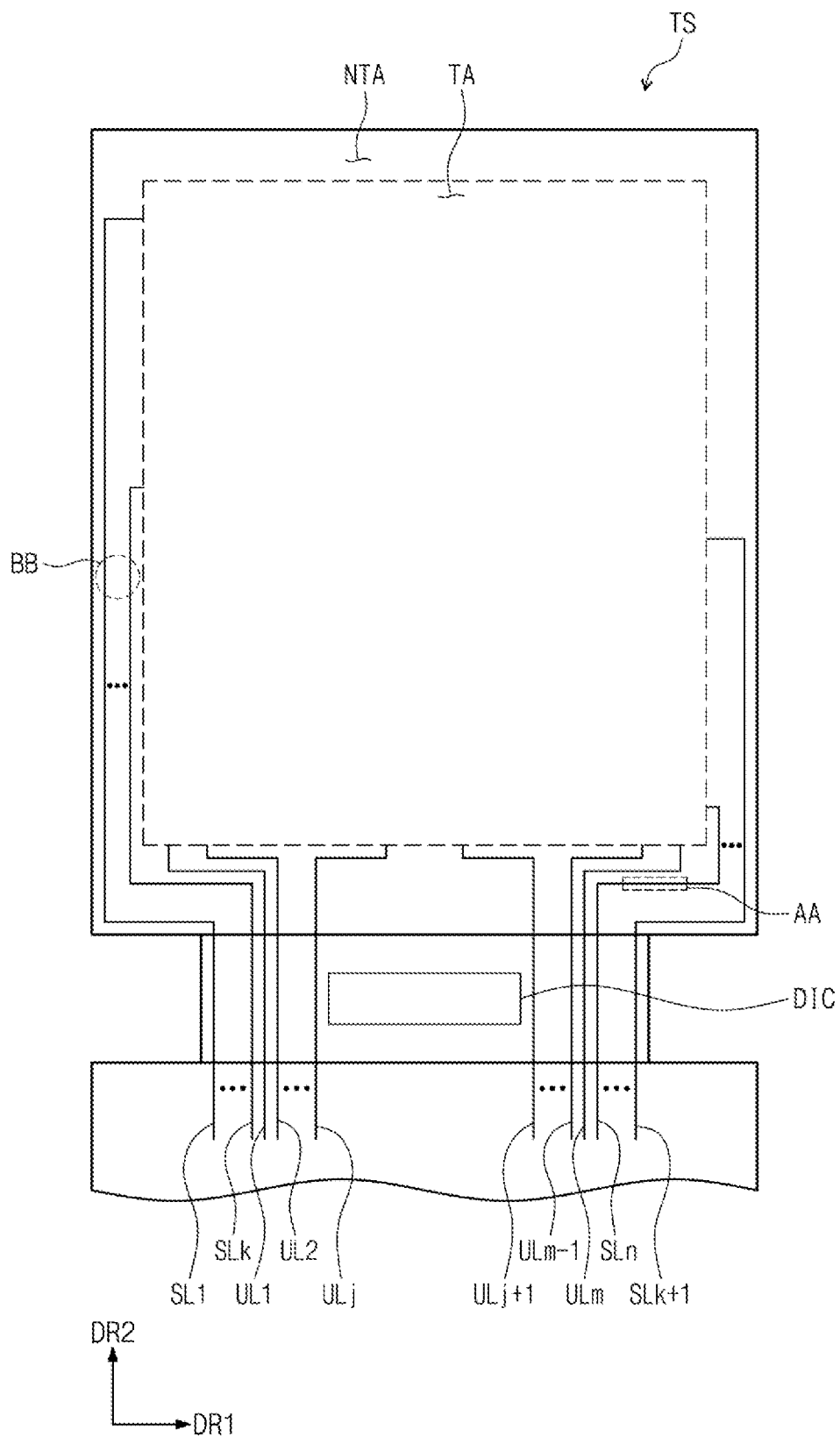
FIG. 6A is a plan view illustrating an input sensing unit illustrated in FIG. 2.
Figure 6B:
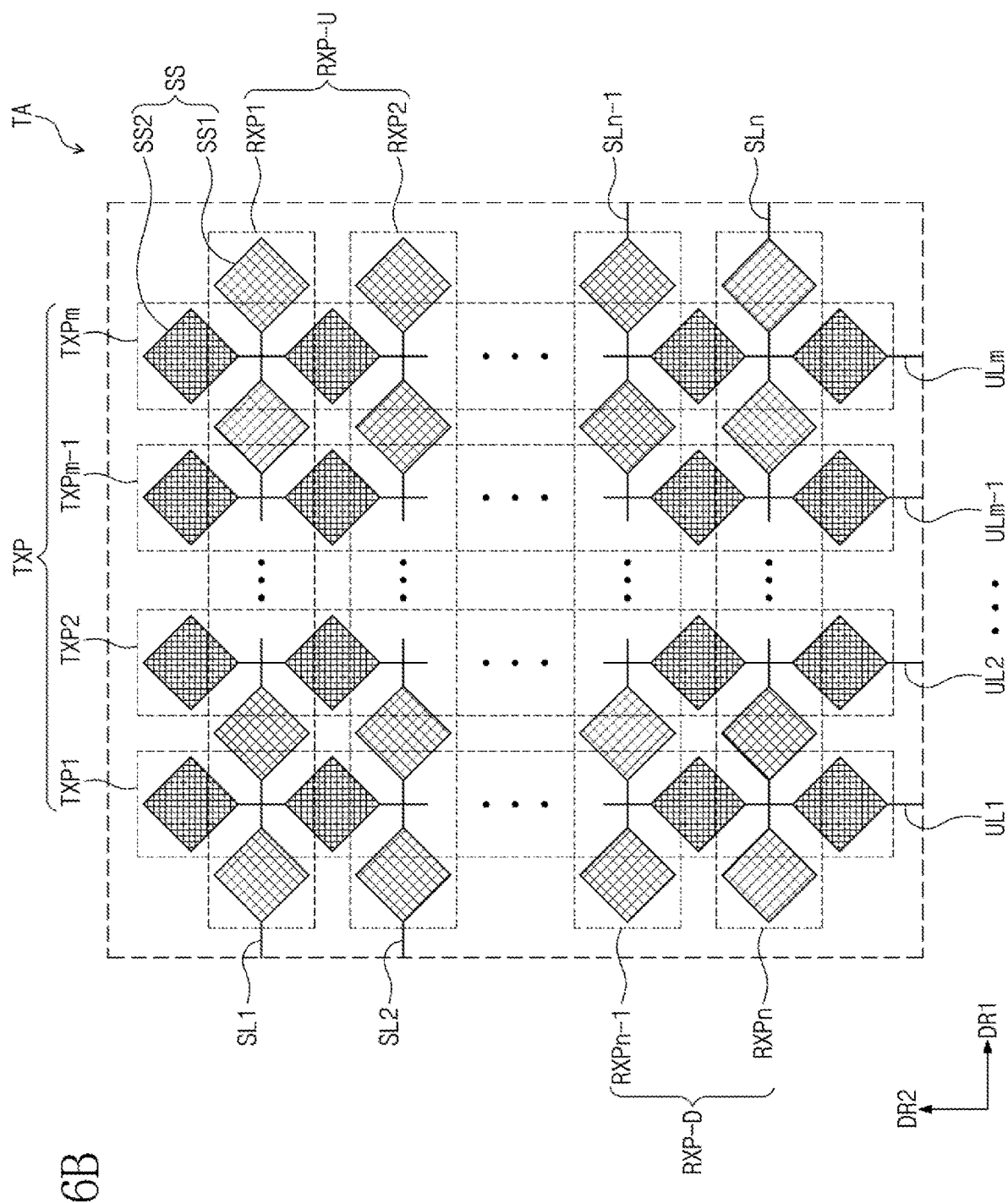
FIG. 6B is a plan view illustrating a sensor area illustrated in FIG. 6A.

FIG. 6A is a plan view illustrating the input sensing unit TS illustrated in FIG. 2. FIG. 6B is a plan view illustrating a sensor area TA illustrated in FIG. 6A.

The input sensing unit TS may include a sensor area TA and a wiring area NTA. The sensor area TA may overlap with the display area DA, the wiring area NTA may overlap with the non-display area NDA.

The sensor area TA may be defined as an area in which sensing electrodes SS are disposed to sense a touch of a user. The wiring area NTA may be defined as an area which is disposed around the sensor area TA and in which interconnection lines and electronic parts for sensing a touch signal from the sensing electrodes SS are disposed.

The sensor area TA includes a plurality of the sensing electrodes SS. The sensing electrodes SS may include first sensing electrodes SS1 and second sensing electrodes SS2. Each of the first and second sensing electrodes SS1 and SS2 may have a mesh shape. The first sensing electrodes SS1 may be capacitively coupled to the second sensing electrodes SS2. The sensing electrodes SS may be disposed directly on the thin film encapsulation layer TFE (see FIG. 5) of the display panel DP (see FIG. 5). Here, the term "directly" means that a process of forming the sensing electrodes SS is performed directly on the thin film encapsulation layer TFE.

Hereinafter, the first sensing electrodes SS1 may be reception sensing electrodes SS1 functioning as a receiver, and the second sensing electrodes SS2 may be transmission sensing electrodes SS2 functioning as a transmitter. However, the shapes and functions of the first and second sensing electrodes SS1 and SS2 are not limited thereto but may be changed.

The sensor area TA may include a reception sensor group RXP-U and RXP-D and a transmission sensor group TXP. The reception sensor group RXP-U and RXP-D may include n reception sensors RXP1 to RXPn, where "n" is a natural number equal to or greater than 2. The transmission sensor group TXP may include m transmission sensors TXP1 to TXPm, where "m" is a natural number equal to or greater than 2.

Each of the reception sensors RXP1 to RXPn includes the reception sensing electrodes SS1 arranged in the first direction DR1. The reception sensors RXP1 to RXPn are arranged in the second direction DR2.

Each of the transmission sensors TXP1 to TXPm includes the transmission sensing electrodes SS2 arranged in the second direction DR2. The transmission sensors TXP1 to TXPm are arranged in the first direction DR1.

The reception sensor group RXP-U and RXP-D includes an upper reception sensor group RXP-U and a lower reception sensor group RXP-D.

The upper reception sensor group RXP-U is disposed above the lower reception sensor group RXP-D in the second direction DR2. The upper reception sensor group RXP-U may include the reception sensors (e.g., RXP1 and RXP2) disposed in an upper area of the sensor area TA in a plan view, and the lower reception sensor group RXP-D may include the reception sensors (e.g., RXPn−1 and RXPn) disposed in a lower area of the sensor area TA in a plan view.

The wiring area NTA may include a plurality of signal lines SL1 to SLn and UL1 to ULm. In the present specification, the signal lines may be referred to as "interconnection lines".

The signal lines SL1 to SLn and UL1 to ULm may include first signal lines SL1 to SLn and second signal lines UL1 to ULm. The first signal lines SL1 to SLn may extend from the first sensing electrodes SS1, and the second signal lines UL1 to ULm may extend from the second sensing electrodes SS2.

Hereinafter, the first signal lines SL1 to SLn may be reception signal lines SL1 to SLn extending from the reception sensing electrodes SS1, and the second signal lines UL1 to ULm may be transmission signal lines UL1 to ULm extending from the transmission sensing electrodes SS2. However, the shapes and functions of the first and second signal lines SL1 to SLn and UL1 and ULm are not limited thereto but may be changed.

The reception signal lines SL1 to SLn may include upper reception signal lines SL1 to SLk (See FIG. 7A) extending from the upper reception sensor group RXP-U and lower reception signal lines SLk+1 to SLn extending from the lower reception sensor group RXP-D.

The upper reception signal lines SL1 to SLk (See FIG. 7A) may extend in a left direction of the sensor area TA, and the lower reception signal lines SLk+1 to SLn may extend in a right direction of the sensor area TA. However, exemplary embodiments of the invention are not limited thereto. In another exemplary embodiment, the upper reception signal lines SL1 to SLk may extend in the right direction of the sensor area TA, and the lower reception signal lines SLk+1 to SLn may extend in the left direction of the sensor area TA.

In an exemplary embodiment of the invention, a first reception signal line SL1 corresponding to the uppermost one of the reception signal lines SL1 to SLn may have the minimum resistance value. In addition, an $n^{th}$ reception signal line SLn corresponding to the lowermost one of the reception signal lines SL1 to SLn may have the maximum resistance value. In other words, the resistance values of the first to $n^{th}$ reception signal lines SL1 to SLn may gradually increase in the order listed. A structure for the resistance value design will be described later with reference to FIGS. 9, 11 and 12B.

The transmission signal lines UL1 to ULm may be symmetrically disposed with respect to an imaginary straight line extending in the second direction DR2. In an exemplary embodiment, the transmission signal lines UL1 to ULm may be classified into the transmission signal lines UL1 to ULj (See FIG. 7A) disposed at a left side of the driving circuit DIC and the transmission signal lines ULj+1 to ULm disposed at a right side of the driving circuit DIC. The transmission signal lines UL1 to ULj disposed at the left side and the transmission signal lines ULj+1 to ULm disposed at the right side may be symmetrical.

Even though not shown in the drawings, the transmission signal lines UL1 to ULm and the reception signal lines SL1 and SLn may be electrically connected to a driving circuit for sensing a touch. In an exemplary embodiment, the driving circuit for sensing a touch may be mounted on a printed circuit board.

Figure 7A:
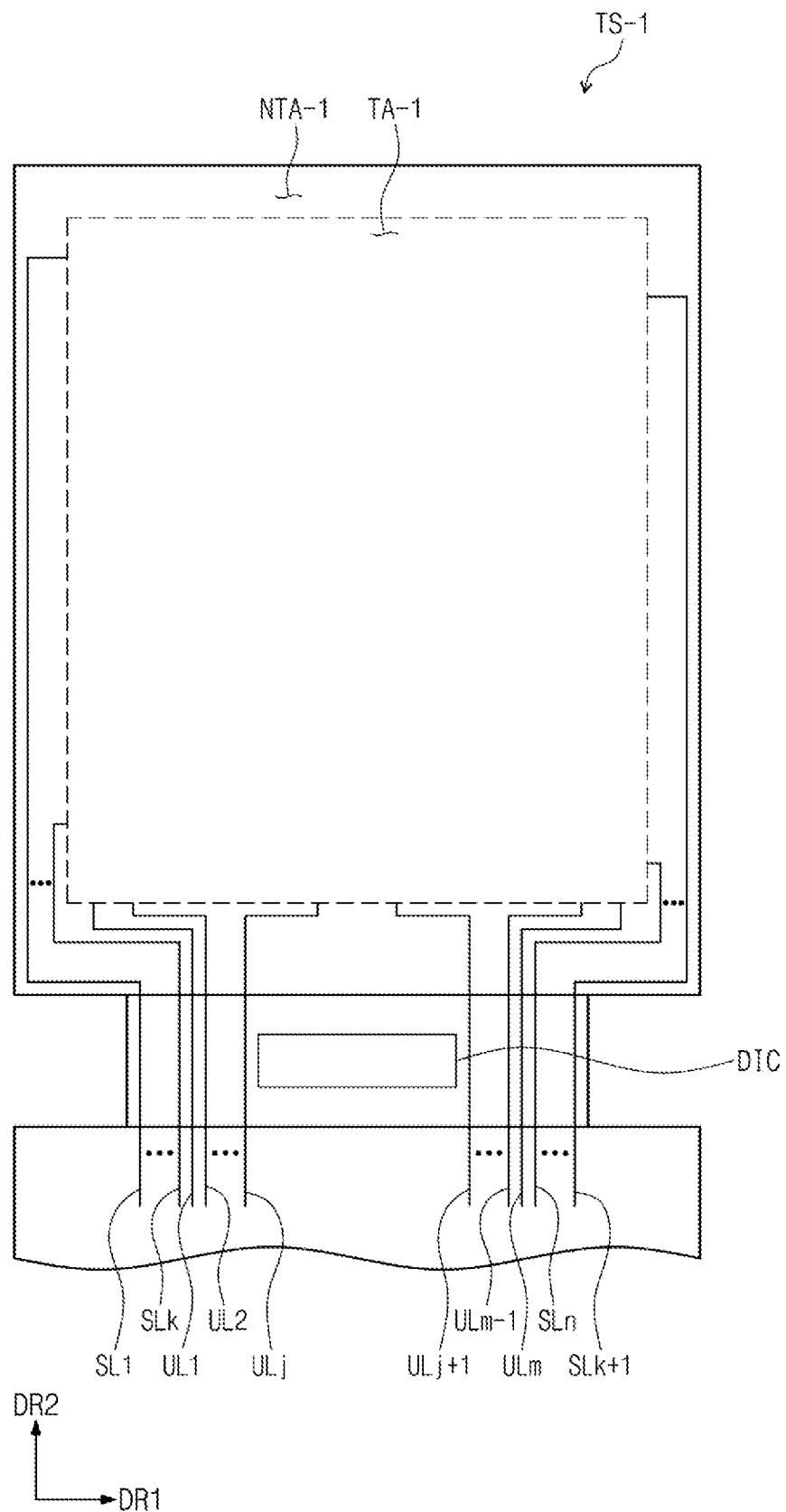
FIG. 7A is a plan view illustrating another exemplary embodiment of the input sensing unit illustrated in FIG. 2.
Figure 7B:
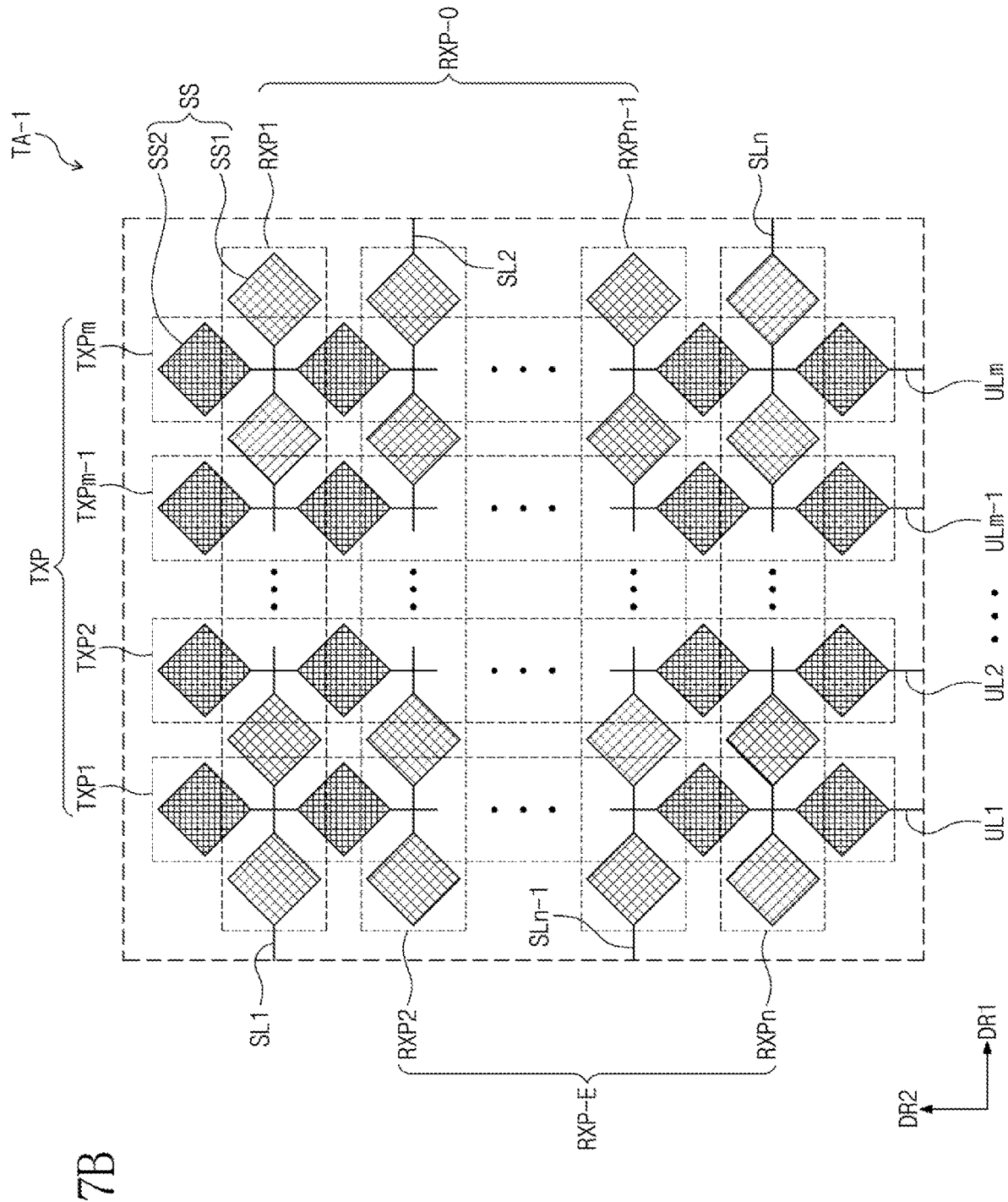
FIG. 7B is a plan view illustrating a sensor area illustrated in FIG. 7A.

FIG. 7A is a plan view illustrating another exemplary embodiment of the input sensing unit illustrated in FIG. 2. FIG. 7B is a plan view illustrating a sensor area TA-1 illustrated in FIG. 7A.

An input sensing unit TS-1 may include a sensor area TA-1 and a wiring area NTA-1. The sensor area TA-1 may overlap with the display area DA, the wiring area NTA-1 may overlap with the non-display area NDA.

The sensor area TA-1 may be defined as an area in which sensing electrodes SS are disposed to sense a touch of a user. The wiring area NTA-1 may be defined as an area which is disposed around the sensor area TA-1 and in which interconnection lines and electronic parts for sensing a touch signal from the sensing electrodes SS are disposed.

The sensor area TA-1 includes a plurality of the sensing electrodes SS. The sensing electrodes SS may be the same as described with reference to FIGS. 6A and 6B, and thus the descriptions thereto are omitted.

The sensor area TA-1 may include a reception sensor group RXP-O and RXP-E and a transmission sensor group TXP. The reception sensor group RXP-O and RXP-E may include n reception sensors RXP1 to RXPn, where "n" is a natural number equal to or greater than 2. The transmission sensor group TXP may include m transmission sensors TXP1 to TXPm, where "m" is a natural number equal to or greater than 2. The transmission sensor group TXP may be the same as described with reference to FIGS. 6A and 6B, and thus the descriptions thereto are omitted.

The reception sensor group RXP-O and RXP-E includes an odd reception sensor group RXP-O and an even reception sensor group RXP-E.

The reception sensors (e.g., RXP1 and RXPn−1) included in the odd reception sensor group RXP-O and the reception sensors (e.g., RXP2 and RXPn) included in the even reception sensor group RXP-E may be alternately arranged in the second direction DR2.

The wiring area NTA-1 may include a plurality of signal lines SL1 to SLn and UL1 to ULm.

The signal lines SL1 to SLn and UL1 to ULm may include first signal lines SL1 to SLn and second signal lines UL1 to ULm.

Hereinafter, the first signal lines SL1 to SLn may be reception signal lines SL1 to SLn extending from the reception sensing electrodes SS1, and the second signal lines UL1 to ULm may be transmission signal lines UL1 to ULm extending from the transmission sensing electrodes SS2. The transmission signal lines UL1 to ULm may be the same as described with reference to FIGS. 6A and 6B, and thus the descriptions thereto are omitted.

The reception signal lines SL1 to SLn may include odd reception signal lines extending from the odd reception sensor group RXP-O and even reception signal lines extending from the even reception sensor group RXP-E.

The odd reception signal lines may extend in a left direction of the sensor area TA-1, and the even reception signal lines may extend in a right direction of the sensor area TA-1. However, exemplary embodiments of the invention are not limited thereto. In another exemplary embodiment, the odd reception signal lines may extend in the right direction of the sensor area TA-1, and the even reception signal lines may extend in the left direction of the sensor area TA-1.

In an exemplary embodiment of the invention, features of resistance values of the reception signal lines SL1 to SLn are the same as described with reference to FIGS. 6A and 6B, and thus the descriptions thereto are omitted.

Referring to FIGS. 6A and 7A, since some and others of the reception signal lines SL1 to SLn are disposed at the left side and the right side of the sensor area TA or TA-1, respectively, an area of the wiring area NTA or NTA-1 can be reduced as compared with a structure in which all reception signal lines are disposed at a left side or a right side of a sensor area.

Figure 8:
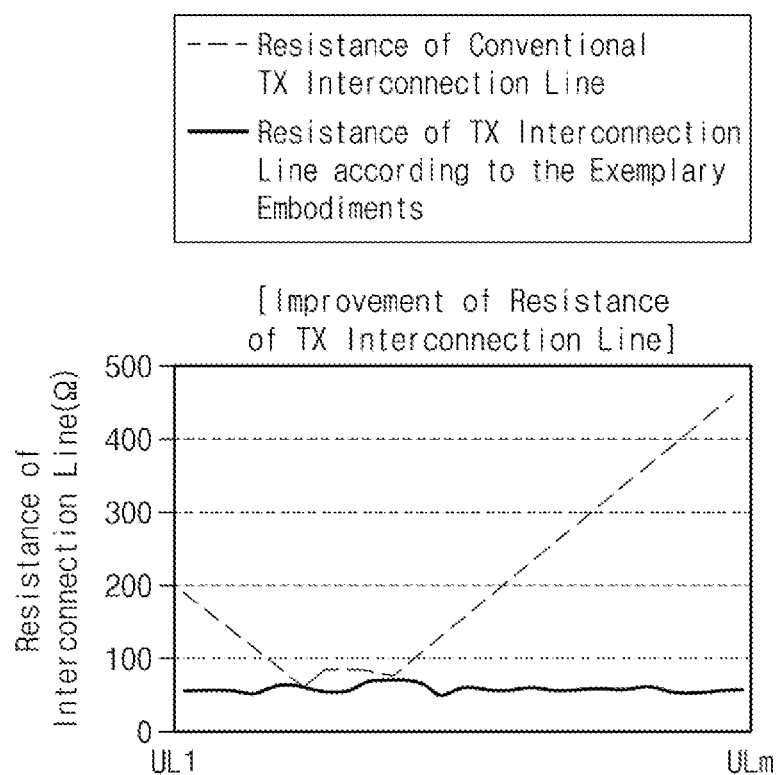
FIG. 8 is a graph comparing resistances of transmission signal lines (TX interconnection lines) of the invention and a conventional art.

FIG. 8 is a graph comparing resistances of transmission signal lines (TX interconnection lines) of the exemplary embodiments and a conventional art.

All transmission signal lines according to the conventional art were disposed at a left side or a right side of a driving circuit DIC, and thus a deviation of lengths of the transmission signal lines was great. A deviation of resistance values of the transmission signal lines was also great due to the great deviation of the lengths, and thus touch sensitivity in a sensor area was not uniform due to a deviation of RC-delay occurring in the transmission signal lines.

On the contrary, as illustrated in FIGS. 6A, 7A, and 8, the transmission signal lines UL1 to ULm according to the exemplary embodiments have similar lengths and are disposed symmetrically with respect to the driving circuit DIC. Thus, the transmission signal lines UL1 to ULm according to the exemplary embodiments may have substantially uniform resistance values.

In more detail, a resistance value of a conventional transmission signal line having the minimum resistance may be in a range of 20% to 25% of a resistance value of a conventional transmission signal line having the maximum resistance. However, in the exemplary embodiments, a resistance value of the transmission signal line having the minimum resistance is 80% or more of a resistance value of the transmission signal line having the maximum resistance. Thus, according to the exemplary embodiments, a deviation of the resistance values of the transmission signal lines UL1 to ULm can be reduced or minimized.

As a result, a deviation of RC-delay occurring in the transmission signal lines UL1 to ULm can be reduced, and thus touch sensitivity in the sensor area TA or TA-1 can be substantially uniform.

Figure 9:
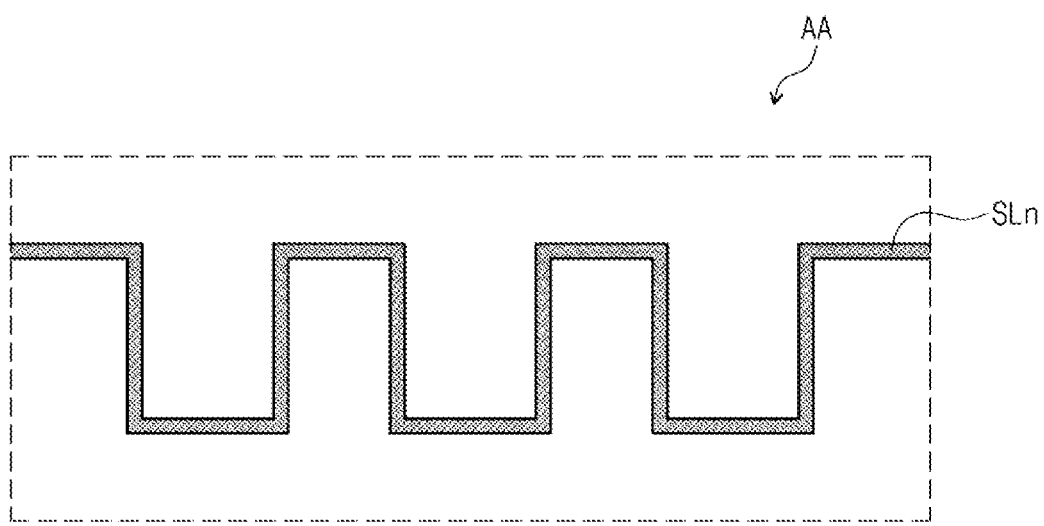
FIG. 9 is an enlarged view of an area 'AA' of FIG. 6A.

FIG. 9 is an enlarged view of an area 'AA' of FIG. 6A.

At least one of the reception signal lines SL1 to SLn may include a resistance value-increasing portion. The resistance value of the reception signal line may be changed by the resistance value-increasing portion. The resistance value-increasing portion may be disposed under the sensor area TA when viewed in a plan view. However, the position of the resistance value-increasing portion is not limited thereto.

The area 'AA' illustrates the resistance value-increasing portion of the $n^{th}$ reception signal line SLn as an example, where n is an integer greater than 1. The resistance value-increasing portion may have a meandering shape, such as a square wave or the like. Since the resistance value-increasing portion has this shape, an entire resistance value of the interconnection line (e.g., the reception signal line) can be increased.

Figure 10:
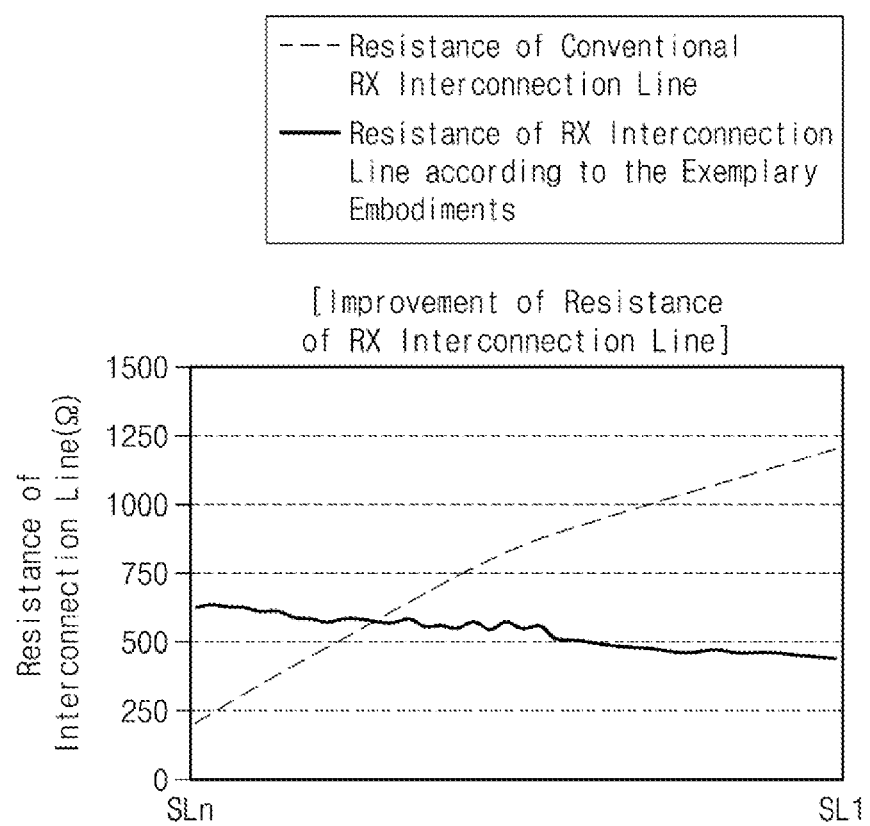
FIG. 10 is a graph comparing resistances of reception signal lines (RX interconnection lines) of the invention and a conventional art.

FIG. 10 is a graph comparing resistances of reception signal lines (RX interconnection lines) of the exemplary embodiments and a conventional art.

Referring to FIGS. 6A, 6B, and 9, the resistance values of the reception signal lines SL1 to SLn sequentially increase from the first reception signal line SL1 to the $n^{th}$ reception signal line SLn. These resistance value features can be realized by the resistance value-increasing portion described with reference to FIG. 9.

Referring to FIGS. 8 and 10, the transmission signal lines UL1 to ULm may have a substantially uniform resistance value distribution. However, a resistance value measured from the transmission sensing electrode SS2 disposed in the upper area is greater than a resistance value measured from the transmission sensing electrode SS2 disposed in the lower area. Thus, in the event that the reception signal lines SL1 to SLn have the resistance value characteristic in which the resistance values of the reception signal lines SL1 to SLn sequentially increase from the first reception signal line SL1 to the $n^{th}$ reception signal line SLn, the resistance value difference between the transmission sensing electrodes SS2 may be compensated to realize or provide the input sensing unit having the uniform touch sensitivity.

Figure 11:
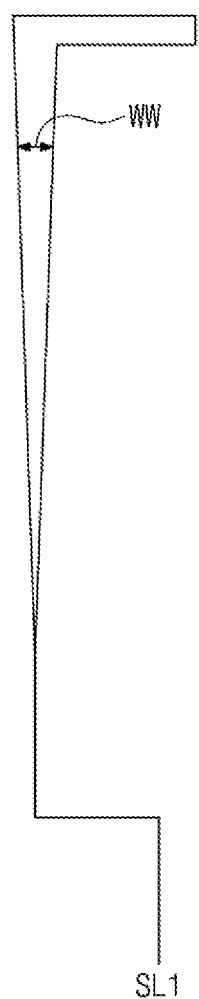
FIG. 11 is a schematic view illustrating a reception signal line according to an exemplary embodiment of the invention.
Figure 11:
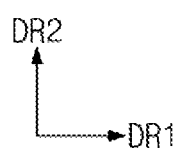

FIG. 11 is a schematic view illustrating a reception signal line SL1 according to an exemplary embodiment. In FIG. 11, the first reception signal line SL1 is illustrated as an example.

The first reception signal line SL1 may have a shape of which a thickness (or a width) WW increases or decreases as it extends in the second direction DR2. In an exemplary embodiment, other reception signal lines SL2 to SLn may also have shapes similar to the shape of the first reception signal line SL1. The thicknesses (or the widths) of the reception signal lines SL1 to SLn may be modified in the present exemplary embodiment to realize the resistance value characteristic illustrated in FIG. 10.

Figure 12A:
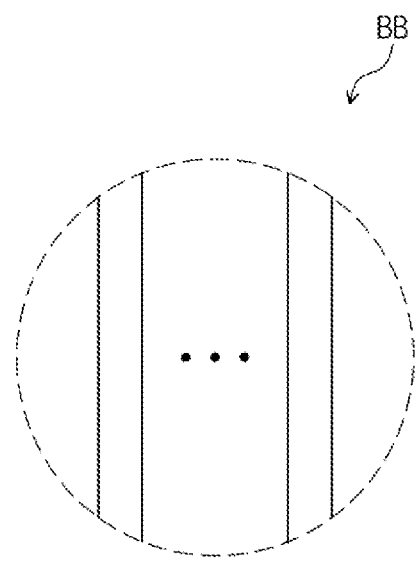
FIG. 12A is an enlarged view of an area 'BB' of FIG. 6A.
Figure 12B:
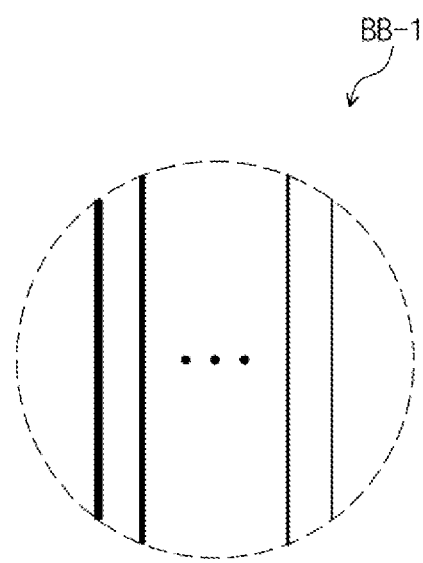
FIG. 12B is an enlarged view illustrating another exemplary embodiment of the area 'BB' of FIG. 6A.

FIG. 12A is an enlarged view of an area 'BB' of FIG. 6A. FIG. 12B is an enlarged view illustrating another exemplary embodiment of the area 'BB' of FIG. 6A.

Referring to FIGS. 6A and 12A, thicknesses (or widths) of the reception signal lines SL1 to SLn may be substantially equal to each other.

Alternatively, referring to FIGS. 6A and 12B, thicknesses (or widths) of the reception signal lines SL1 to SLn may be different from each other. In more detail, in the reception signal lines SL1 to SLn, the reception signal line having a relatively long length in the second direction DR2 may have a relatively great thickness (or width). This is because a resistance value increasing by the increase in length is compensated by the increase in thickness (or width).

Figure 13:
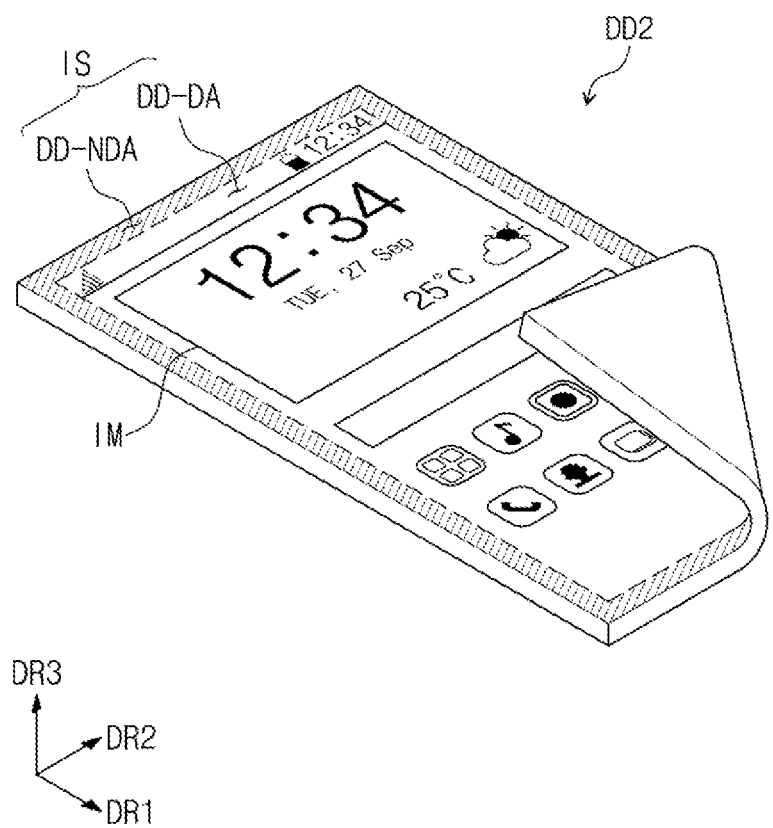
FIG. 13 is a perspective view illustrating a display device according to an exemplary embodiment of the invention.

FIG. 13 is a perspective view illustrating a display device DD2 according to an exemplary embodiment. Referring to FIG. 13, a portion or an entire portion of a display device DD2 may be bendable or rollable.

According to an exemplary embodiment, the area of the wiring area formed near the edge of the input sensing unit can be reduced to increase the area of the touch sensing area. In addition, the display device having a narrow bezel may be provided.

According to an exemplary embodiment, the display device can provide the touch sensing surface which has substantially uniform sensitivity as a whole.

Although certain exemplary embodiments and implementations have been described herein, other exemplary embodiments and modifications will be apparent from this description. Accordingly, the inventive concepts are not limited to such exemplary embodiments, but rather to the broader scope of the presented claims and various obvious modifications and equivalent arrangements.

What is claimed is:

1. A display device comprising:
   a display panel including a first region and a second region spaced apart from the first region in a first direction;
   a driving circuit disposed on the second region;
   sensors disposed on the display panel and overlapping the first region; and
   lines disposed on the display panel and electrically connected to the sensors, respectively, and extending from the sensors toward the second region,
   wherein:
   the lines comprise first lines and second lines;
   the first lines and the second lines are spaced apart from each other in a second direction crossing the first direction with the driving circuit interposed therebetween;
   a first line of the first lines closest to the second lines has a first bent portion bent toward the second lines and a first extended portion extending along the first direction;
   a second line of the second lines closest to the first lines has a second bent portion bent toward the first lines and a second extended portion extending along the first direction;
   the first bent portion and the second bent portion are disposed between the driving circuit and the first region; and
   the first extended portion and the second extended portion spaced apart from each other with the driving circuit interposed therebetween.

2. The display device of claim 1, wherein:
   the sensors comprise first sensors arranged along the first direction, and second sensors arranged along the second direction;
   the lines further comprise third lines and fourth lines;
   the first lines are electrically connected to some second sensors of the second sensors, respectively;
   the second lines are electrically connected to remaining second sensors of the second sensors, respectively;
   the third lines are electrically connected to some first sensors of the first sensors, respectively; and
   the fourth lines are electrically connected to a remaining first sensor of the first sensors, respectively.

3. The display device of claim 2, wherein the some first sensors and the remaining first sensors are sequentially arranged along the first direction.

4. The display device of claim 2, wherein a number of the some first sensors and a number of the remaining first sensors are the same, and the number of the some second sensors and number of the remaining second sensors are the same.

5. The display device of claim 1, wherein the display panel further comprises a light-emitting element layer disposed in the first region and an encapsulation layer sealing the light-emitting element layer.

6. The display device of claim 5, wherein the sensors are disposed directly on the encapsulation layer.

7. The display device of claim 1, wherein the sensors have a mesh shape.

8. The display device of claim 1, wherein a first distance between the first bent portion and the second bent portion is less than a second distance between the first extended portion and the second extended portion.

9. The display device of claim 1, wherein the first lines and the second lines are symmetrical with respect to the driving circuit.

10. A display device comprising:
- a display panel including a first region and a second region spaced apart from the first region in a first direction;
- sensors disposed on the display panel and overlapping the first region; and
- lines disposed on the display panel and electrically connected to the sensors, respectively, and extending from the sensors toward the second region, wherein:

the lines comprise first lines and second lines;

the first lines and the second lines are spaced apart from each other in a second direction crossing the first direction;

a first line of the first lines closest to the second lines has a first bent portion bent toward the second lines and a first extended portion extending away from the first region along the first direction;

a second line of the second lines closest to the first lines has a second bent portion bent toward the first lines and a second extended portion extending away from the first region along the first direction;

a first distance between the first bent portion and the second bent portion is less than a second distance between the first extended portion and the second extended portion; and the first and second bent portions are closer to the sensor than the first and second extended portions.

* * * * *